United States Patent Office 2,991,192
Patented July 4, 1961

2,991,192
PROCESS OF COATING GRAPHITE WITH NIOBIUM-TITANIUM CARBIDE
Frank A. Halden, Sunnyvale, William D. Smiley, Palo Alto, and Frank M. Hruz, Los Altos, Calif., assignors to the United States of America as represented by the United States Atomic Energy Commission
No Drawing. Filed Oct. 30, 1958, Ser. No. 770,901
9 Claims. (Cl. 117—22)

This invention relates in general to refractory metallic carbide coatings for graphite and to superior materials and methods for producing such coatings. More specifically, the invention relates to refractory niobium carbide coatings for graphite to which an amount of titanium has been added to increase the graphite wetting properties of metallic niobium.

In the present age of nuclear reactors, high speed missiles and jet or rocket propulsion engines and many other technological fields, there are ever increasing needs for refractory structures and surfaces which are stable and retain strength at much higher operating temperatures than heretofore employed and often in the presence of oxidizing or reducing atmospheres, ionizing radiation, high pressures or vacuums, and other severe and unusual conditions which ordinary materials of construction will not withstand. Graphitic carbon is a material which admirably satisfies many of the necessary requirements in this field. Graphite possesses highly desirable properties including low density, high melting or sublimation point and high structural strength at higher temperatures, permitting its use where most other structural materials, including common metals, are not satisfactory. In addition, graphite has a low neutron absorption cross-section while possessing the adequate moderating capacity required in nuclear reactors and associated systems.

However, the normal properties of graphite are inadequate in certain respects and in particular environments. Graphite erodes and corrodes at high gas pressures, velocities and temperatures. Many gases and other materials react with graphite or are absorbed in an undesirable manner in certain environments. To alleviate this difficulty in nuclear reactors, for example, graphite moderator blocks have been contained within a non-reactive metal such as zirconium or aluminum to prevent adsorption of or reaction with the coolant. However, in gas cooled reactors and especially in mobile, lightweight, compact reactors having single piece graphite cores, this form of construction is disadvantageous due to bulk, low structural strength and other factors.

In addition to the problem of finding or selecting a graphite coating which has the desired properties, there is also the problem of applying the coating in such a manner that an adhesive bond between the graphite and the coating will be obtained. Electroplating, vapor decomposition, vapor deposition, chemical reduction, dip coating, and chemical and mechanical cladding are possible methods employed generally in coating work. With carbide coatings the metal is of necessity generally contacted with the graphite by one of these methods and then carburized in place. In the past this has placed severe limitations on the several materials known to have good coating properties, since many of the metals either cannot be dispersed properly over the graphite or else uneven or non-adherent coatings result.

Of prime importance in the heating and carburization of variously deposited metals to produce a tenaciously bonded carbide is the ability of metal to wet the graphite when the metal is heated. Many or most of the desirable refractory forming metals do not effectively wet the graphite or penetrate into the graphite pore system, as preferred, prior to carburization to obtain best results.

The carbides of niobium have been found to form particularly unique and desirable graphite coatings for work in the nuclear energy field because of their high melting point, low thermal neutron cross section, non-reactivity, and other reasons. However, adherent coatings, as shown above, have been difficult to produce quickly and over large surface areas because of the difficulty in contacting or wetting graphite with niobium metal prior to carburization at an elevated temperature.

It has now been discovered that the wetting property of niobium used in the production of niobium carbide coatings on graphite is substantially improved by the addition of titanium to the niobium. The mix is preferably in the form of an alloy, but may also be in a mixture of powders ground to at least —200 mesh. The mixture may be contacted with the graphite initially by any of the methods previously used or suggested in the prior art. The metal and graphite are then outgassed at a high temperature below the melting point of the metal or the point at which carburization in a solid-solid reaction occurs, the temperature is raised to the melting point where melting, spreading and carburization occur, and the coated graphite is finally cooled. Increased wetting and penetration of the graphite is achieved over samples similarly treated and containing only niobium. The resultant coating is hard, adheres tenaciously to the graphite, and has an estimated melting point of 3400° C. Usefulness of the coating in nuclear reactors is partially dependent upon the neutron adsorption cross section; however, by holding the titanium to 20% or less, compositions with satisfactory nuclear properties are obtained.

Accordingly, an object of the invention is to provide refractory coatings on graphite surfaces, and a method for producing same.

A further object of the invention is to provide metallic niobium-titanium carbide coatings on graphite for use in high temperature erosive and corrosive environments and in high-temperature gas cooled nuclear reactors.

Another object of the invention is to provide a niobium base alloy with superior graphite wetting characteristics.

Another object of the invention is to provide a method of increasing the graphite wetting characteristics of niobium.

Another object of the invention is to provide a graphite coating of niobium-titanium or niobium-titanium carbides.

Another object of the invention is to provide an improved method for coating graphite with niobium by mixing the niobium with a quantity of titanium, degassing at a temperature below the metallic melting points and thereafter heating the mixture to a temperature above the intermetallic melting point whereby the graphite surface is wet by the metallic mixture.

Other objects and advantages of the invention will become apparent by consideration of the following description.

The graphite structures or surfaces to be coated are fabricated in accordance with conventional practices. For example reactor components may be machined graphite of the usual reactor grades. In certain gas cooled reactors, uranium impregnated graphite cores having a multitude of gas cooled passages or channels are employed. A coolant or exhaust gas such as $H_2$, $CH_4$, $NH_3$, or $N_2$, is passed through the channel while the reactor core is operating and is thereby heated to a highly elevated temperature.

No particular grade of niobium and titanium need be used, since fractional percent impurities of the types most likely to occur, i.e., oxides and carbides, can be tolerated. However, quality of the results will in general be related to grade or purity. The metals are preferably in the form of an alloy, but an admixture of the two metals in which each is finer than −200 mesh suffices. While experimental results show advantageous wetting at almost any ratio above 5–10% titanium, use in the nuclear field will be quite limited to percentages of less than 20% titanium.

Since the advantage of the invention lies in the superior wetting and bonding properties, the method of application may be adapted to any coating method old or new in the art making use of these properties. Specifically, the metals are most easily disposed in a finely divided state, at least −200 mesh after alloying or mixing, over a graphite surface so that individual particles rest loosely thereon. They may be either evenly distributed or distributed in small evenly spaced piles, the distance to be determined empirically for each experimental condition. While the metal should spread and wet large distances in the molten state, in practice carburization begins to take place soon after molten contact, thereby limiting the actual practical distance to the order of an inch. Further, since the spreading is affected adversely by gaseous impurities, the distance will be different for each new condition, i.e., gaseous atmosphere, such as presence of $O_2$ and $N_2$, and for each batch of materials. Because of the sensitive nature of the process, the spreading distance may vary slightly even with apparent similar conditions and batches of material, although better spreading and bonding will be observed in each case for Nb—Ti, than for Nb alone.

The entire assembly is next subjected to heat and vacuum sufficient to degas both the metal and the graphite. This is necessary because, as is well known, chemi-adsorbed gases seriously impede any wetting process. If desired, the materials may be degassed separately at a higher temperature. However, when together, a temperature of 1,000° C. at 10 microns for 10 to 30 minutes suffices.

The temperature is now raised to above the melting point, about 2350° C., while the apparatus is still undergoing evacuation. Because longer times tend to produce inferior or incomplete coatings, a temperature rise time of under 10 minutes is preferred. The upper temperature is limited by the point at which the solid metal tends to carburize in place. Neither the pumping speed nor the intermediate pressure are critical, although there should be sufficient capacity to quickly remove gases evolved, particularly $O_2$ and $N_2$, small quantities of which may affect wetting action if not pumped out quickly. By raising the temperature quickly the metal melts and spreads rapidly over the adjoining area before the carburization reaction takes place. At the end of 5 to 10 minutes the wetting and carburization is essentially complete. There results an adherent coating with a thickness depending upon the original disposition of the powders, but at least 10 to 40 mils in thickness where the amount of powders present is sufficient to produce a film of this thickness. Excellent penetration of the graphite is also obtained.

By comparison, niobium powders alone used in an otherwise identical process wet the graphite to a lesser extent, or not at all if the conditions are not closely controlled, e.g., high pumping speeds. The reason for this is not exactly known. The addition of the titanium may change the melting point, viscosity or other factors to a point more conducive to wetting. Another theory is that the titanium acts as a getter for certain gaseous impurities, leaving the niobium to melt and wet freely.

*Example*

In order to establish the influence of titanium upon niobium wetting of graphite, powder mixtures of −200 mesh niobium containing 2, 5, 10, 50, 70 and 90% titanium of the same mesh size were prepared. Samples of each of these mixtures weighing about 0.2 g. each, as well as samples of pure niobium powder, were then placed in National Carbon Co. ATJ grade graphite crucibles made by drilling 7/32 inch diameter holes 5/8 inch deep in graphite blocks. ATJ is a near reactor grade graphite of fine particle size with small uniformly distributed pores totaling about 15% voids. Loose graphite was removed by means of an air blast, and the crucibles were normally outgassed for several minutes at temperatures above 2400° C. and at pressures of about 200 microns, prior to disposition of the samples. After application of the samples, the furnace was evacuated to about 10 microns and heated to 1000° C. for a 10 minute outgassing period. The temperature was then raised to 2350° C. over a period of 5–6 minutes during which wetting occurred and finally held at that temperature for one minute to insure complete carburization.

Very active and complete wetting and penetration of the graphite was obtained with compositions having titanium contents higher than 10%; the metal coated the entire hole area and in many cases coated a short distance around the hole in the carbon block. Thickness of the carbide coat varied up to 40 mils, depending upon distance from the original metal source. However in the samples containing no titanium or less than 10% titanium, incomplete wetting of the hole occurred and the resulting coat did not adhere well to the graphite. In the samples containing no titanium at all the coating tended to easily break free from the graphite during subsequent grinding and polishing of sections.

While the invention has been described with respect to several preferred embodiments, it will be apparent to those skilled in the art that numerous variations and modifications may be made within the spirit and scope of the invention and thus it is not intended to limit the invention except as defined in the following claims.

What is claimed is:

1. In an improved method for reacting niobium with graphite to produce an adherent refractory coating having niobium on the exterior surface thereof, comprising the steps of producing finely divided powders including intimately mixed niobium and titanium, contacting graphite with said powders, degassing said metals and graphite, heating said materials to a temperature of 2350° C. to achieve melting of the metal powders and thereafter cooling said materials.

2. In an improved method for reacting niobium with graphite to produce an adherent refractory coating of solid metal carbide, the process comprising the steps of producing finely divided powders comprising niobium and titanium, contacting graphite with said powders, degassing said metals and graphite at a temperature below the melting point of said metals, heating said materials rapidly to a temperature above about 2350° C. and maintaining said temperature until said metals are carburized.

3. The process of claim 2 in which the metals are initially finely divided and spread over the graphite surface.

4. The process of claim 2 in which the metals comprise niobium together with not more than 20% titanium.

5. In a process for coating graphite with an adherent, continuous layer of metallic carbide, comprising the steps of contacting graphite with niobium metal intimately mixed with a quantity of titanium metal, outgassing said metals and graphite at a temperature below the melting point of said metals, and heating said graphite and metals rapidly to a temperature slightly above the melting point of said metals under vacuum whereby said metals melt and wet said graphite and carburize thereon.

6. The process of claim 5 in which the metals are first ground to at least −200 mesh.

7. The process of claim 5 in which the metals and graphite are degassed for at least 10 minutes at 1000° C. under 10 microns vacuum.

8. The process of claim 5 in which the graphite and metals are heated to about 2350° C. within a time period of about 5 minutes and maintained at said temperature thereafter for at least one minute.

9. In a process for coating graphite with an adherent, continuous layer of metallic carbides, comprising the steps of preparing intimately mixed niobium and less than 20% titanium as a powder of at least −200 mesh, contacting portions of said metal powders with a graphite surface, outgassing said metals and graphite for at least ten minutes at less than 10 microns vacuum pressure at a temperature of at least 1000° C., heating said materials rapidly to a temperature above about 2350° C. within about 5 minutes, and thereafter maintaining said temperature for a time sufficient to carburize said metals.

References Cited in the file of this patent

UNITED STATES PATENTS

| | | |
|---|---|---|
| 912,245 | Kuzel | Feb. 9, 1909 |
| 1,374,909 | De Bats | Apr. 19, 1921 |
| 1,374,910 | De Bats | Apr. 19, 1921 |
| 2,030,695 | Erber | Feb. 11, 1936 |
| 2,418,420 | Moberly | Apr. 1, 1947 |
| 2,548,897 | Kroll | Apr. 17, 1951 |
| 2,865,828 | Long et al. | Dec. 23, 1958 |
| 2,866,724 | Alexander | Dec. 30, 1958 |
| 2,872,398 | Ashley et al. | Feb. 3, 1959 |
| 2,929,741 | Steinberg | Mar. 22, 1960 |